United States Patent [19]

Steinberg

[11] 4,417,566
[45] Nov. 29, 1983

[54] SOLAR OVEN ACCESS DOOR

[76] Inventor: Hyman A. Steinberg, 7200 NW. 78th St., Tamarac, Fla. 33319

[21] Appl. No.: 319,735

[22] Filed: Nov. 9, 1981

[51] Int. Cl.³ ............................................. F24J 3/02
[52] U.S. Cl. .................................. 126/451; 126/438
[58] Field of Search ............... 126/438, 439, 440, 451, 126/45 R; 99/422; 220/5 R

[56] References Cited

U.S. PATENT DOCUMENTS

| 681,095 | 8/1901 | Baker | 126/451 |
|---|---|---|---|
| 683,089 | 9/1901 | Wideen | 126/451 |
| 4,236,508 | 12/1980 | Kerr | 126/451 |
| 4,284,071 | 8/1981 | Steinberg | 126/451 |
| 4,292,957 | 10/1981 | Golder | 126/451 |

Primary Examiner—James C. Yeung

[57] ABSTRACT

An improved access door for a solar oven. The access door's inner surface, which holds a disposable food tray, is provided with a depressed area below the food tray to permit deformation of the tray bottom when the thickness of food in the tray exceeds the depth of the food tray.

9 Claims, 5 Drawing Figures

SOLAR OVEN ACCESS DOOR

BACKGROUND OF THE INVENTION

This invention relates generally to solar ovens and more specifically to a solar oven having a comparatively rigid, fixed collector plate that provides heat to the oven's interior compartment, and a hinged compartment access door that holds a tray of food against the collector plate during operation of the oven. It is essential, in such ovens, that the food be held in direct contact with, or in close proximity to the heated collector plate, in order to effect sufficient heat transfer for proper food preparation. However, the resulting fixed dimension between the collector plate and the inner surface of the hinged access door restricts the thickness of food that can be prepared in the oven. For instance, if large, quartered chicken parts or steaks with protruding bones are placed within the food tray, and their thickness exceeds the fixed dimension between the door's inner surface and the collector plate, irreparable damage is caused when the oven door is closed. The damage usually consists of a collector plate that is deformed or torn away from its perimeter mooring. This particular problem has seriously limited the usefullness of solar ovens.

SUMMARY OF THE INVENTION

This invention describes an improved solar oven access door construction which permits the preparation of foods of varying thickness in the oven, without damaging the permanent parts of the oven.

In accordance with the present invention, the inner surface of the oven's access door, which holds a disposable food tray, is provided with a depressed area below the bottom of the food tray, to permit the tray bottom to expand into the depressed area if the food thickness exceeds the tray depth. The disposable food trays used in solar ovens are usually made of thin aluminum foil and have a corrugated bottom surface. The corrugated bottom can easily deform to accommodate the pressure due to any excess thickness of food in the tray. This deformation, if unobstructed below the plane of the bottom of the tray, can substantially increase the available depth for food within the tray.

Generally, the depressed area below the tray need only be from $\frac{1}{8}''$ to $1''$ in depth to accomplish its primary purpose, which is to provide room for deformation of the tray bottom. However, since the depressed area can also serve other purposes, such as providing an area for warming baked goods during operation of the oven, or for the storage of cold food prior to operation of the oven, the depressed area may be made appropriately deeper.

The positioning means for the food tray, which usually consists of a raised shoulder surrounding the sides of the tray at its bottom edge, may also be utilized to suspend the food tray above the depressed area by raising the shoulder so that its supports the underside of the rim at the upper edge of the tray.

Accordingly, it is an object of this invention to provide space for the deformation of the bottom of the disposable food tray in a solar oven and thereby prevent damage to the collector plate in the oven.

It is another object of this invention to utilize this same space as a warming compartment for buns or other soft, baked goods that will not obstruct the deformation of the bottom of the food tray.

It is a further object of this invention to utilize this same space as a secondary compartment for the preparation of packaged foods or heating a container of liquid during operation of the solar oven, or for the storage of cold food or liquids, prior to the operation of the solar oven.

These and other objects will become readily apparent upon reading and viewing the accompanying specifications and drawings.

DESCRIPTION OF THE PREFERRED EMBODIMENT

Figure 1:
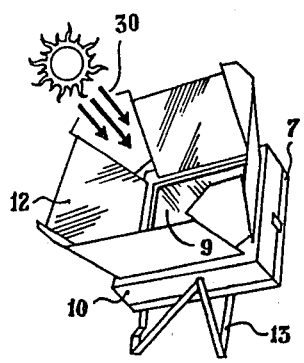
FIG. 1 is a pictorial view of a typical solar oven in an operating mode.

Referring now in detail to the drawings, wherein an embodiment of the present invention is shown, and referring particularly to FIG. 1, a typical solar oven is illustrated as it appears in an operating mode. Sunlight 30, which is reflected by the removable surrounding reflectors 12 and also enters directly through transparent plate 9, is absorbed and converted to heat by a blackened collector plate below the transparent plate 9, where an interior heating compartment is located. The reflectors 12 are removably attached to an outer body structure 10, which has a hinged rear access door 7 and is supported on an adjustable stand 13.

Figure 4:
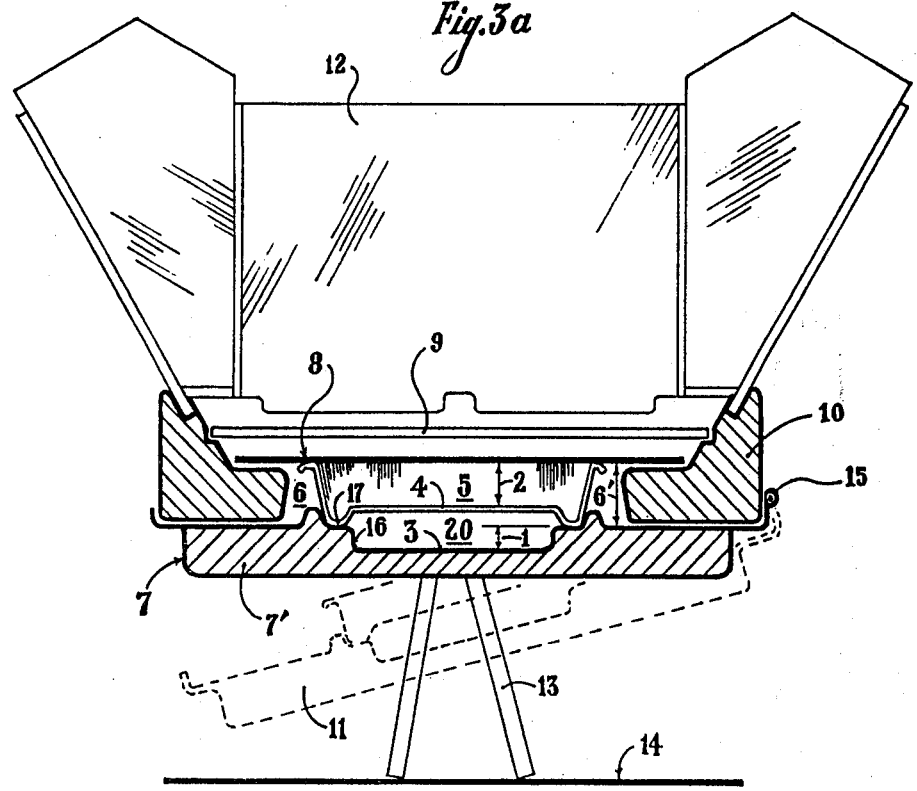
FIG. 4 is a complete cross-sectional view through a typical solar oven.

FIG. 4, which is a complete cross-section through the typical solar oven, illustrates the relative positions of all of the parts of the oven in greater detail. The sunlight that passes through the transparent plate 9, strikes a blackened metallic collector plate 8 and is converted to heat that is transmitted to the interior heating compartment 6, where the food is prepared. All of the solar oven's components are attached to the outer, insulated body structure 10, which is supported and positioned by the stand 13 that rests on ground surface 14. The outer casing 7 of the access door, hinged to the body structure at 15, contains a body of insulation 7' and an interior surface 16 which is configured to support and position the removable food tray 5 at outer, bottom edge 17. The food tray can be inserted or removed from the oven by opening the access door to position 11.

The depth of space normally available for food in the heating compartment 6 is the depth 2 of the food tray 5, plus any additional depth provided by the corrugated bottom 4 of the food tray, for a total maximum depth 6' within the compartment 6. The depressed area 20, which is the subject of this invention and is defined by the side 16 and bottom 3 door surfaces and the flat or corrugated bottom 4 of the food tray, provides the additional depth 1 required to permit deformation of the food tray bottom 4.

Figure 3:
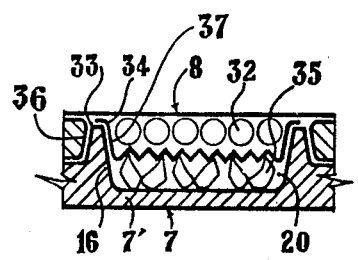
FIG. 3 is a partial, cross-sectional view of the access door, showing the food tray suspended above the depressed area by a raised positioning shoulder.
Figure 3A:
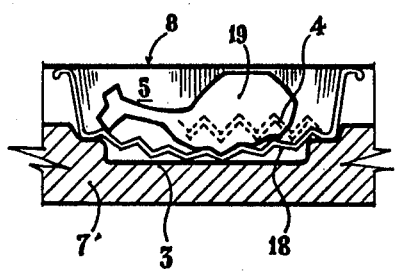
FIG. 3a is a partial, cross-sectional view of the access door, showing the food tray bottom deformed into the depressed area by food in the tray.

FIG. 3a illustrates the tray deforming action that takes place within the depressed area when the access door is closed tightly, as it must be to prevent heat loss from the cooking compartment. The normal position of the tray bottom 4 becomes displaced to 18, near the bottom surface 3 of the depressed area, by the excessively thick food portion 19 which may be inadvertently or purposely placed in the food tray 5. This action prevents deformation or damage to the rigid collector plate 8.

Figure 2:
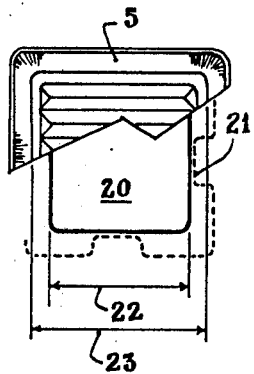
FIG. 2 is a partial, top view of the food tray and the depressed area within the surface of the oven access door.

FIG. 2, in a partial top view, shows the position of the food tray as it is seated over the depressed area 20 which has a narrower opening dimension 22 than the food tray's parallel bottom edge dimension 23. In another possible arrangement, the depressed area opening may be larger than the tray bottom, provided that at least a portion of the depressed area 21 is narrower than the tray's parallel bottom edge dimension 23 and supports the tray. A further arrangement in supporting the tray above the depressed area is shown in FIG. 3. Here, the side 16 of the depressed area is extended upward, between the side 36 of the body structure and the side 37 of the food tray, to the underside 33 of the upper rim 34 of the food tray where it forms a support for the tray. This extended side may be partial or continuous along the underside of the tray rim 34.

FIG. 3, furthermore, illustrates how the depressed area 20 may be utilized for the warming of buns 35, during the preparation of frankfurters 32 or other foods in the tray, without serious impairment of the function of the depressed area. The depressed area 20 can conveniently be used as a secondary compartment for heating additional foods, such as contained vegetables or soups, while the main cooking is being done in the food tray, and it may also be used for the storage of cold, packaged foods or liquids, prior to the operation of the oven.

Referring again to FIG. 4, the inner door surface 16 of the body to insulation 7' may consist of a thin, molded covering of heat-resistant plastic, to provide a cleanable, non-porous surface for the depressed area 20. The surface 16 may also be covered with a heat-reflective coating, or a material such as aluminum foil, to reduce the heat loss from the depressed area 20 through the body of insulation 7'. Although the primary purpose of the depressed area 20—to provide room for deformation of the food tray—could be served by a depressed area depth 1 of from ⅛" to 1½", this depth may be made greater to also serve the other purposes mentioned herein.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In a solar oven, including an outer body structure with an opening at one end, means for concentrating sunlight into said opening wherein a blackened, fixed metallic plate converts sunlight to heat, the reverse side of said plate comprising the inner, heated surface of a compartment for the preparation of food held within a removable and deformable tray, and an access door for the insertion and removal of said tray, said access door consisting of an outer casing hinged to said body structure, a body of insulation within said casing, and an inner door surface configured to position and support said tray within said compartment and to bring said tray into contact with said metallic plate when said door is in closed position, the improvement comprising:
   a depressed area within said inner door surface, extending below the plane of the bottom edge of said tray, to permit the deformation and intrusion of the central portion of said tray into said depressed area.

2. A solar oven as set forth in claim 1, wherein:
   at least a portion of the upper edge of said depressed area supports the bottom edge of said tray above the bottom surface of said depressed area.

3. A solar oven as set forth in claim 1, wherein:
   at least a portion of said inner door surface, between the outside wall of said tray and the inside wall of said compartment, extends to the underside of the upper rim of said tray to support said tray above the bottom surface of said depressed area.

4. A solar oven as set forth in claim 1, wherein:
   at least one side dimension of the opening of said depressed area is less than the parallel side dimension of the bottom edge of said tray and provides a ledge for supporting said tray above the bottom surface of said depressed area.

5. A solar oven as set forth in claim 1, wherein:
   said depressed area is molded into a thin, heat-resistant material covering the inner surface of said body of insulation in said door casing.

6. A solar oven as set forth in claim 5, wherein:
   the surface of said heat-resistant material is heat-reflective to reduce the heat loss through said body of insulation.

7. A solar oven as set forth in claim 1, wherein:
   said depressed area is of sufficient depth to provide space for the heating of baked goods during the operation of said oven.

8. A solar oven as set forth in claim 1, wherein:
   said depressed area is of sufficient depth to provide space for the heating of contained foods and liquids below said tray during the operation of said oven.

9. A solar oven as set forth in claim 1, wherein:
   said depressed area is of sufficient depth to provide space for the storage and transport of foods and liquids prior to the operation of said oven.

* * * * *